(12) United States Patent
Yang

(10) Patent No.: US 7,213,572 B2
(45) Date of Patent: May 8, 2007

(54) SYSTEM AND METHOD FOR ENGINE OPERATION WITH SPARK ASSISTED COMPRESSION IGNITION

(75) Inventor: Jialin Yang, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 11/233,172

(22) Filed: Sep. 21, 2005

(65) Prior Publication Data
US 2007/0062484 A1   Mar. 22, 2007

(51) Int. Cl.
*F02P 5/00* (2006.01)
*F02B 17/00* (2006.01)

(52) U.S. Cl. .................. 123/406.11; 123/295

(58) Field of Classification Search .......... 123/406.11, 123/406.15, 406.17, 435, 295, 305, 563, 123/700
See application file for complete search history.

(56) References Cited

U.S. PATENT DOCUMENTS

| | | | |
|---|---|---|---|
| 5,036,668 | A | 8/1991 | Hardy |
| 6,267,097 | B1 | 7/2001 | Urushihara et al. |
| 6,276,334 | B1 | 8/2001 | Flynn et al. |
| 6,293,246 | B1 | 9/2001 | Tanahashi et al. |
| 6,295,973 | B1 | 10/2001 | Yang |
| 6,336,436 | B1 | 1/2002 | Miyakubo et al. |
| 6,390,054 | B1 | 5/2002 | Yang |
| 6,516,774 | B2 | 2/2003 | zur Loye et al. |
| 6,561,157 | B2 * | 5/2003 | zur Loye et al. ............ 123/295 |
| 6,570,265 | B1 | 5/2003 | Shiraishi et al. |
| 6,619,254 | B2 | 9/2003 | Chmela et al. |
| 6,622,710 | B2 | 9/2003 | Hasegawa et al. |
| 6,659,071 | B2 * | 12/2003 | LaPointe et al. ............ 123/299 |
| 6,675,579 | B1 | 1/2004 | Yang |
| 6,725,825 | B1 | 4/2004 | Kurtz et al. |
| 6,739,295 | B1 | 5/2004 | Yamaoka et al. |
| 6,923,167 | B2 | 8/2005 | Flowers |
| 6,932,175 | B2 | 8/2005 | Teraji et al. |
| 2004/0065279 | A1 | 4/2004 | Hitomi et al. |
| 2004/0134449 | A1 * | 7/2004 | Yang ........................ 123/27 R |
| 2004/0149255 | A1 * | 8/2004 | zur Loye et al. ............ 123/295 |
| 2004/0182359 | A1 | 9/2004 | Stewart et al. |
| 2004/0220720 | A1 * | 11/2004 | Noda .......................... 701/111 |
| 2005/0121008 | A1 | 6/2005 | Kikenny et al. |
| 2005/0173169 | A1 | 8/2005 | Gray, Jr. |

OTHER PUBLICATIONS

O. Lang et al, "Thermodynamical and Mechanical Approach Towards a Variable Valve Train for the Controlled Auto Ignition Combustion Process," SAE Technical Paper No. 2005-01-07, Apr. 11-14, 2005.

* cited by examiner

*Primary Examiner*—John T. Kwon
(74) *Attorney, Agent, or Firm*—Allan J. Lippa; Alleman Hall McCoy Russell & Tuttle LLP

(57) ABSTRACT

A method of operating an internal combustion engine having a combustion chamber with a piston, comprising of adjusting an operating parameter of the engine so that a mixture of air and fuel in the combustion chamber approaches, but does not achieve, an autoignition temperature, and performing a spark from the spark plug so that said second mixture combusts; adjusting a timing of said spark from the spark plug; and adjusting an operating parameter to increase a correlation between said adjusted spark timing and timing of said combustion.

20 Claims, 8 Drawing Sheets

SYSTEM AND METHOD FOR ENGINE OPERATION WITH SPARK ASSISTED COMPRESSION IGNITION

FIELD

The present application relates to controlling engine operation during various combustion modes.

BACKGROUND AND SUMMARY

Various types of combustion may be used in an internal combustion engine. For example, spark ignition (SI) of a homogenous mixture during the expansion stroke is one example method. This method relies on a timed spark from a sparking plug in order to achieve ignition within the combustion chamber of an air and fuel mixture. Another type of combustion may be referred to as homogeneous charge compression ignition (HCCI), which occurs when the temperature of the combustion chamber exceeds the autoignition temperature for the specific fuel resulting in autoignition. HCCI can be used to provide greater fuel efficiency and reduced NOx production under some conditions.

One approach to utilizing autoignition is described in U.S. Pat. No. 6,293,246. In this approach, rather than relying on autoignition to initiate combustion, a spark assisted type of auto-ignition operation is utilized. Specifically, the approach in U.S. Pat. No. 6,293,246 relies on spark assist at all times in order to initiate autoignition of a mixture that has been raised to a temperature close to the autoignition temperature. In this example, the spark assisted combustion process requires the temperature of the gas within the combustion chamber attain a state near autoignition without achieving combustion. By firing a spark and initiating combustion in a portion of the combustion chamber, the pressure, and hence the temperature, may be increased in the entire combustion chamber. Thus, the gases which were near autoignition, are elevated to or above the autoignition temperature, thus autoignition occurs throughout the chamber. This phenomena is in contrast to spark ignition combustion in which a spark is fired thereby initiating a flame front which progresses through the combustion chamber into a mixture. In contrast, spark ignition combustion occurs in a mixture which is rich enough to sustain and propagate a flame front. Furthermore, the mixture is cool enough ahead of the flame front to resist autoignition. A sparking mechanism is then utilized to assist in initiating combustion within the chamber.

The inventors herein have recognized a disadvantage with such an approach. Specifically, conditions may exist during such spark assist operations where autoignition of the air/fuel mixture may occur prior to the initiated spark. In such situations the engine may experience degraded operation.

In one approach, the above issues may be addressed by a method of operating an internal combustion engine having a combustion chamber with a piston. The method comprises: adjusting an operating parameter of the engine so that a mixture of air and fuel in the combustion chamber approaches, but does not achieve, an autoignition temperature, and performing a spark from the spark plug so that said second mixture combusts; adjusting a timing of said spark from the spark plug; and determining whether timing of said combustion correlates to timing of said spark. In one example, based on this determining, engine operating parameters can be adjusted to ensure the timing of the spark correlates to the timing of combustion.

In this way, it is possible to achieve reliable spark assisted HCCI operation across a substantially broad range of operating conditions. Therefore improved fuel economy and reduced emissions may be obtained.

In another example, a method of operating an internal combustion engine having a combustion chamber with a piston may be used. The method comprises: adjusting an operating parameter of the engine so that a mixture of air and fuel in the combustion chamber approaches, but does not achieve, an autoignition temperature, and performing a spark from the spark plug so that said second mixture combusts; adjusting a timing of said spark from the spark plug; and adjusting an operating parameter to increase a correlation between said adjusted spark timing and timing of said combustion.

In this way, it is possible to maintain control of combustion timing during a spark-assisted autoignition operation and thereby achieve improved performance, even when various parameters may inadvertently influence combustion.

DETAILED DESCRIPTION OF THE DRAWINGS

DETAILED DESCRIPTION

Figure 1:
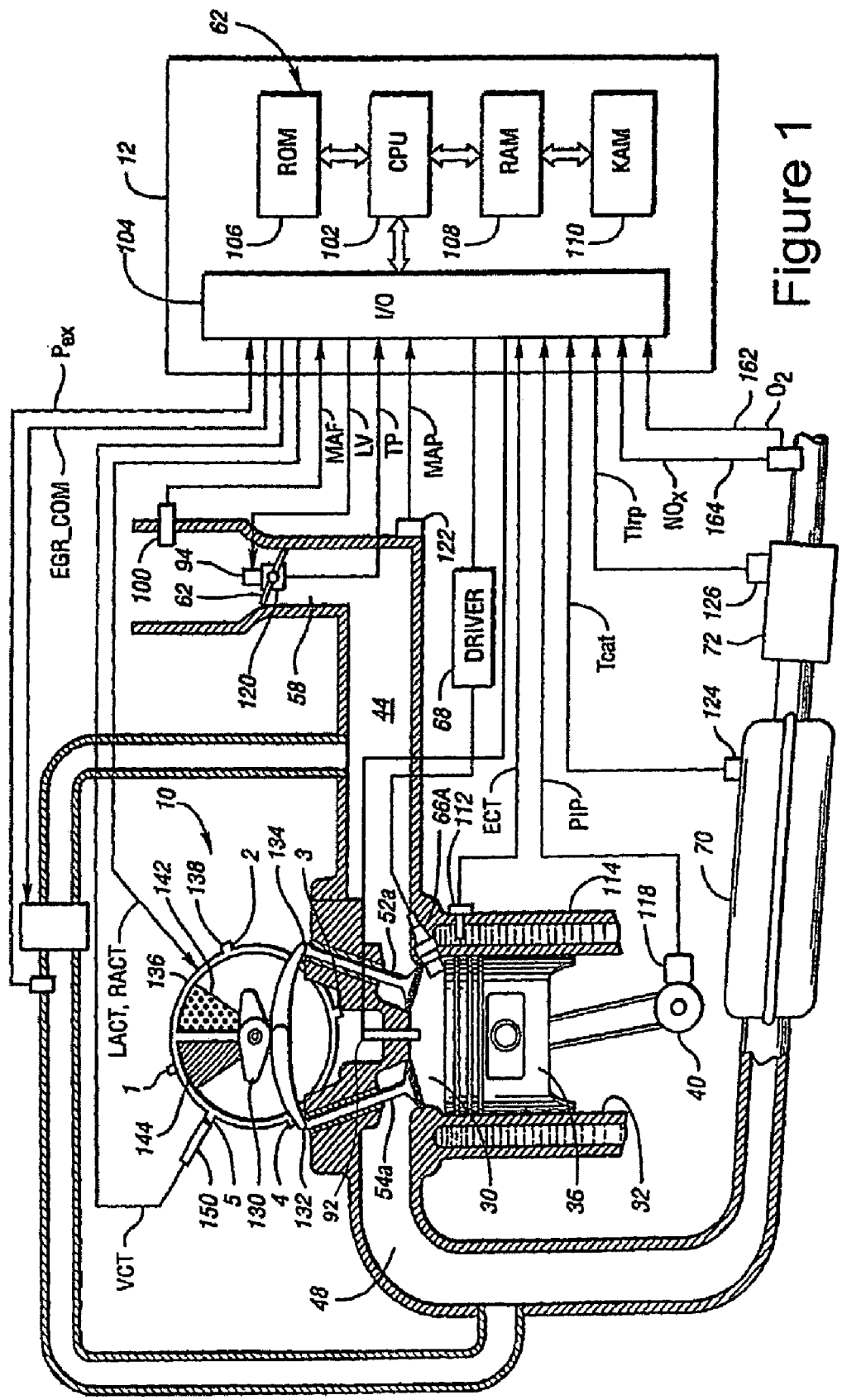
FIG. 1 shows an internal combustion engine and control system.

Direct injection spark ignited internal combustion engine 10, comprising a plurality of combustion chambers, is controlled by electronic engine controller 12 as shown in FIG. 1. Combustion chamber 30 of engine 10 includes combustion chamber walls 32 with piston 36 positioned therein and connected to crankshaft 40. In one example, piston 36 includes a recess or bowl (not shown) to form selected levels of stratification or homogenization of charges of air and fuel. Alternatively, a flat piston may also be used.

Combustion chamber 30 is shown communicating with intake manifold 44 and exhaust manifold 48 via respective intake valves 52a and 52b (not shown), and exhaust valves 54a and 54b (not shown). Fuel injector 66 is shown directly coupled to combustion chamber 30 for delivering liquid fuel directly therein in proportion to the pulse width of signal fpw received from controller 12 via conventional electronic driver 68. Fuel is delivered to fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. Exhaust gas oxygen sensor 76 is shown coupled to exhaust manifold 48 upstream of catalytic converter 70. In an alternative embodiment, sensor 76 can provide a signal which indicates whether exhaust air-fuel ratio is either lean of stoichiometry or rich of stoichiometry. A mechanical supercharger (not shown) or mechanical turbocharger (not shown) may be coupled to engine 10, in one example.

Distributorless ignition system (not shown) provides ignition spark to combustion chamber 30 via spark plug 92 in response to spark advance signal SA from controller 12. Controller 12 activates fuel injector 66 during the intake stroke so that a desired air-fuel ratio mixture is formed when ignition power is supplied to spark plug 92 by an ignition system. Controller 12 controls the amount of fuel delivered by fuel injector 66 so that the air-fuel ratio mixture in chamber 30 can be selected to be substantially at (or near) stoichiometry, a value rich of stoichiometry, or a value lean of stoichiometry.

Nitrogen oxide (NOx) absorbent or trap 72 is shown positioned downstream of catalytic converter 70. NOx trap 72 absorbs NOx when engine 10 is operating lean of stoichiometry. The absorbed NOx is subsequently reacted with HC and catalyzed during a NOx purge cycle when controller 12 causes engine 10 to operate in either a rich mode or a near stoichiometric mode.

Controller 12 is shown in FIG. 1 as a conventional microcomputer including: microprocessor unit 102, input/output ports 104, an electronic storage medium of executing programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load.

As will be described in more detail below, combustion in engine 10 can be of various types, depending on operating conditions. In one example, spark ignition (SI) can be employed where the engine utilizes a sparking device, such as spark plug coupled in the combustion chamber, to regulate the timing of combustion of combustion chamber gas at a predetermined time after top dead center of the expansion stroke. In one example, during spark ignition operation, the temperature of the air entering the combustion chamber is considerably lower than the temperature required for autoignition. While SI combustion may be utilized across a broad range of engine load and engine speed it may produce increased levels of NOx and lower fuel efficiency when compared with other types of combustion.

Another type of combustion that may be employed by engine 10 uses homogeneous charge compression ignition (HCCI), where autoignition of combustion chamber gases occurs at a predetermined point after the compression stroke of the combustion cycle or near top dead center of compression. Since the air/fuel mixture is highly diluted by air or residuals, which results in lower combustion gas temperature, the production of NOx may be dramatically reduced compared to levels found in SI combustion. Further, fuel efficiency with autoignition of lean (or diluted) air/fuel mixture may be increased by reducing the engine pumping loss, increasing gas specific heat ratio, and by utilizing a higher compression ratio.

During HCCI combustion, autoignition of the combustion chamber gas is controlled to occur at a desired position of the piston to generate desired engine torque, and thus it may not be necessary to initiate a spark from a sparking mechanism to achieve combustion. Note that during a HCCI mode the engine operation may still utilize what may be referred to as a waste spark, where the spark plug is fired at a later point after which auto-ignition should have occurred (i.e., the spark is present to initiate combustion in cases where the auto-ignition temperature is inadvertently not attained). In this way, reliable combustion can be provided even through some deviation in the temperature control may occur and the expected auto-ignition temperature is not achieved.

A third type of combustion that may be performed by engine 10 utilizes a sparking device to initiate (or assist) combustion when the temperature of the combustion chamber gas approaches an autoignition temperature (e.g., reaches a level substantially near autoignition without achieving combustion). Such a spark assist type of combustion can exhibit increased fuel efficiency and reduce NOx production over that of SI combustion, yet may operate in higher load range than compared with HCCI combustion. Spark assist may also offer an overall larger window for controlling temperature since it may not be necessary to precisely attain an autoignition temperature at a specified timing in the engine cycle. In other words, without spark assistance a small change in temperature may result in a rather large change in combustion timing, thus affecting engine output and performance. In the spark assist mode, it is possible to attain many of the benefits of HCCI combustion, but to rely on the spark timing to provide the final energy needed to attain autoignition and thus more precisely control the timing of combustion. Thus, in one example, under some conditions, spark assist may also be used during transitions between SI combustion and HCCI.

In one embodiment, the spark assist mode may be operated where a small amount of fuel is provided to the gases near the spark plug. This small cloud of fuel may be used to allow a flame to better propagate and generate increased pressure in the cylinder to thereby initiate autoignition of the remaining air-fuel mixture. Thus, a relatively small cloud of richer gases may be used that are proximate to the spark plug, which can also be homogenous, stratified, or slightly stratified. One approach to provide such operation may be to utilize a second direct fuel injection in the compression stroke.

One example of an application involving at least the three combustion modes presented above may include the use of SI for startup and/or after engine startup during an engine warming period. After such engine startup and engine warming, the combustion process may transition through spark assist combustion to HCCI combustion for improved economy and emissions. During periods of high engine load requirements, spark assist may be activated to ensure proper combustion timing. As the engine is returned to a low or moderate load requirement, the involvement of spark assist may cease in order to realize the full benefits of HCCI.

Figure 2:
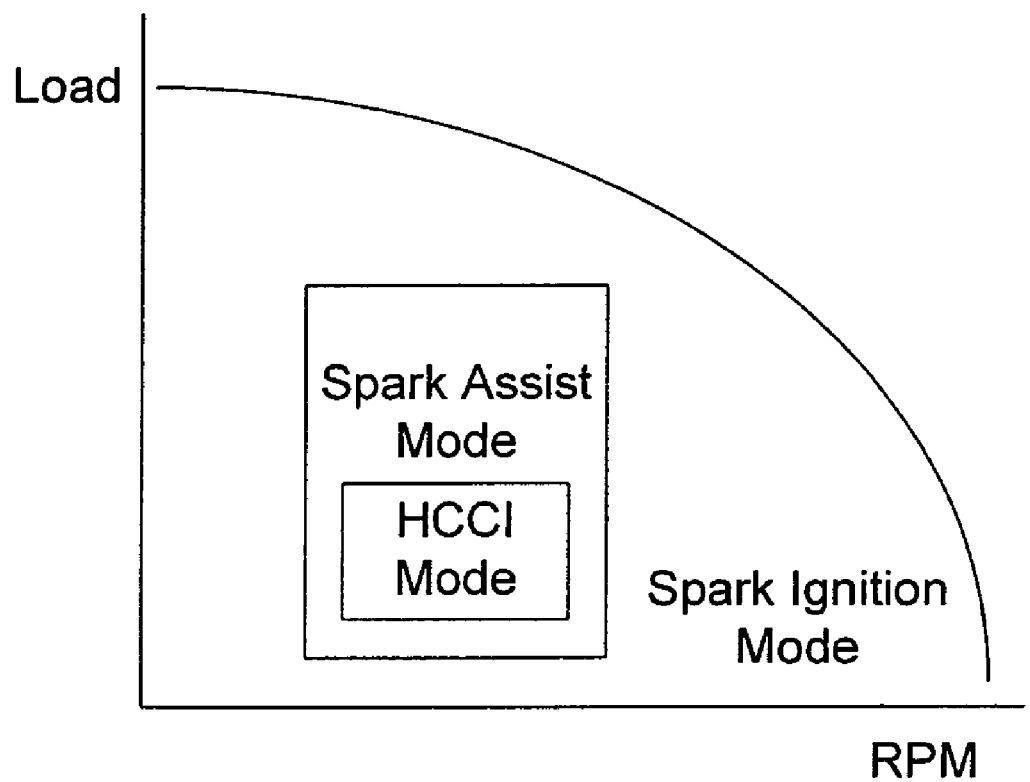
FIG. 2 shows various combustion modes operating at various load/rpm requirements.

In one embodiment of the application, engine operation can be divided into different desired combustion modes depending on the engine speed and load. FIG. 2 shows three combustion mode regions depending on engine speed and load. While FIG. 2 shows example mode regions, these may be adjusted depending on various factors, such as engine design, emissions, etc. Also, while FIG. 2 shows three different modes, additional modes may also be used. Further, only two modes may be used, if desired.

Continuing with FIG. 2, in this example, the HCCI mode is in a lower speed and load region, and is surrounded by a spark-assist mode. Further, spark ignition mode is shown for the remainder of the operating envelope. While FIG. 2 shows different modes depending on speed and load, various other conditions may be used, such as desired torque, manifold pressure, indicated torque, engine brake torque, temperature, combinations thereof, and various others.

As shown in FIG. 2, the HCCI region may be contained within the SI operating region in one example. Thus, in one embodiment, the ignition strategy can follow a transitional spark assist mode prior to entering the HCCI combustion region from the outer SI combustion region. However, in an alternative embodiment, the engine may transition directly between SI and HCCI modes or any combination of operating modes. Further, as noted above, additional modes may be used, such as stratified combustion, or others.

Figure 3A:
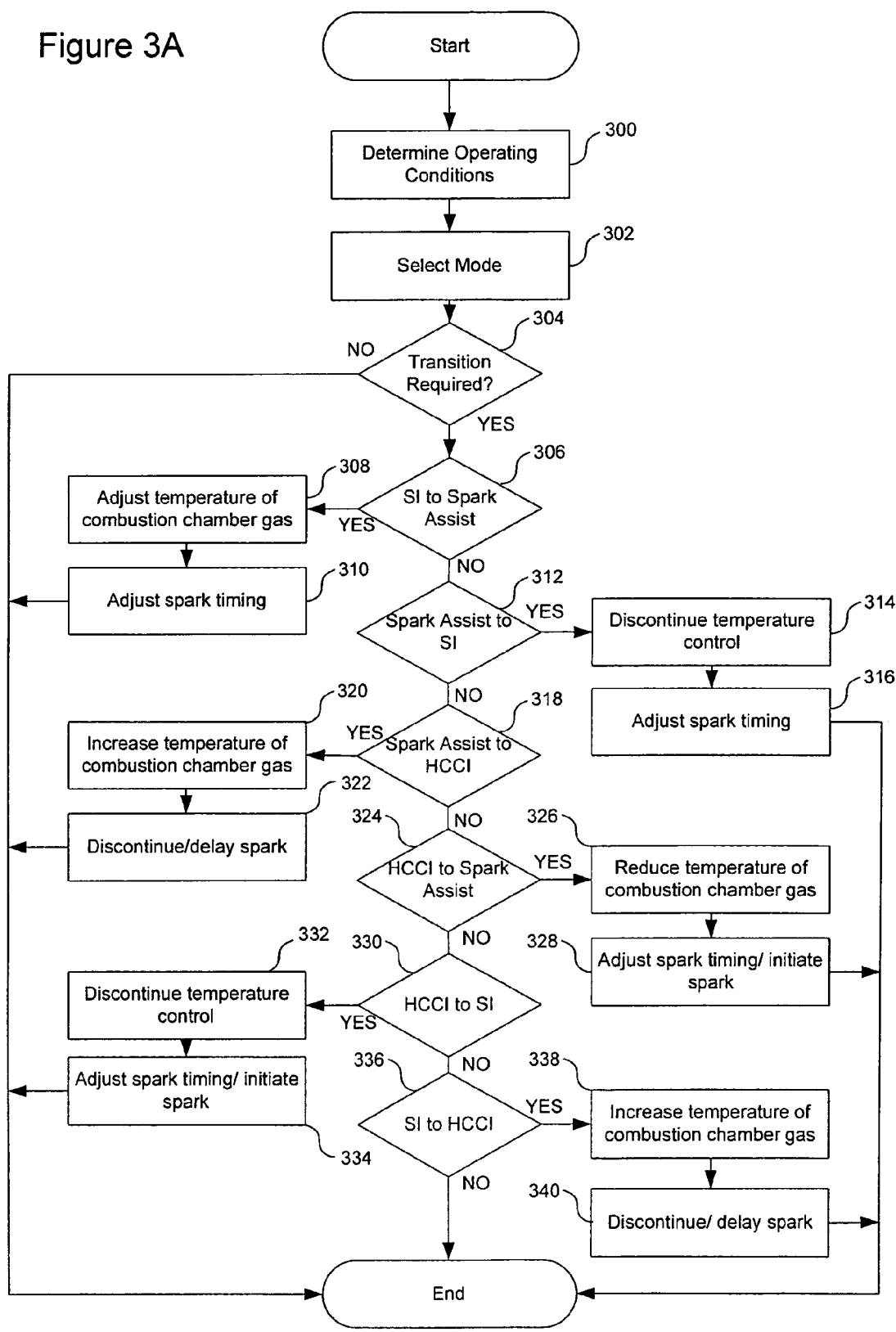
FIGS. 3A and 3B are flowcharts depicting an example method for selectively varying the combustion mode during engine operation.
Figure 3B:
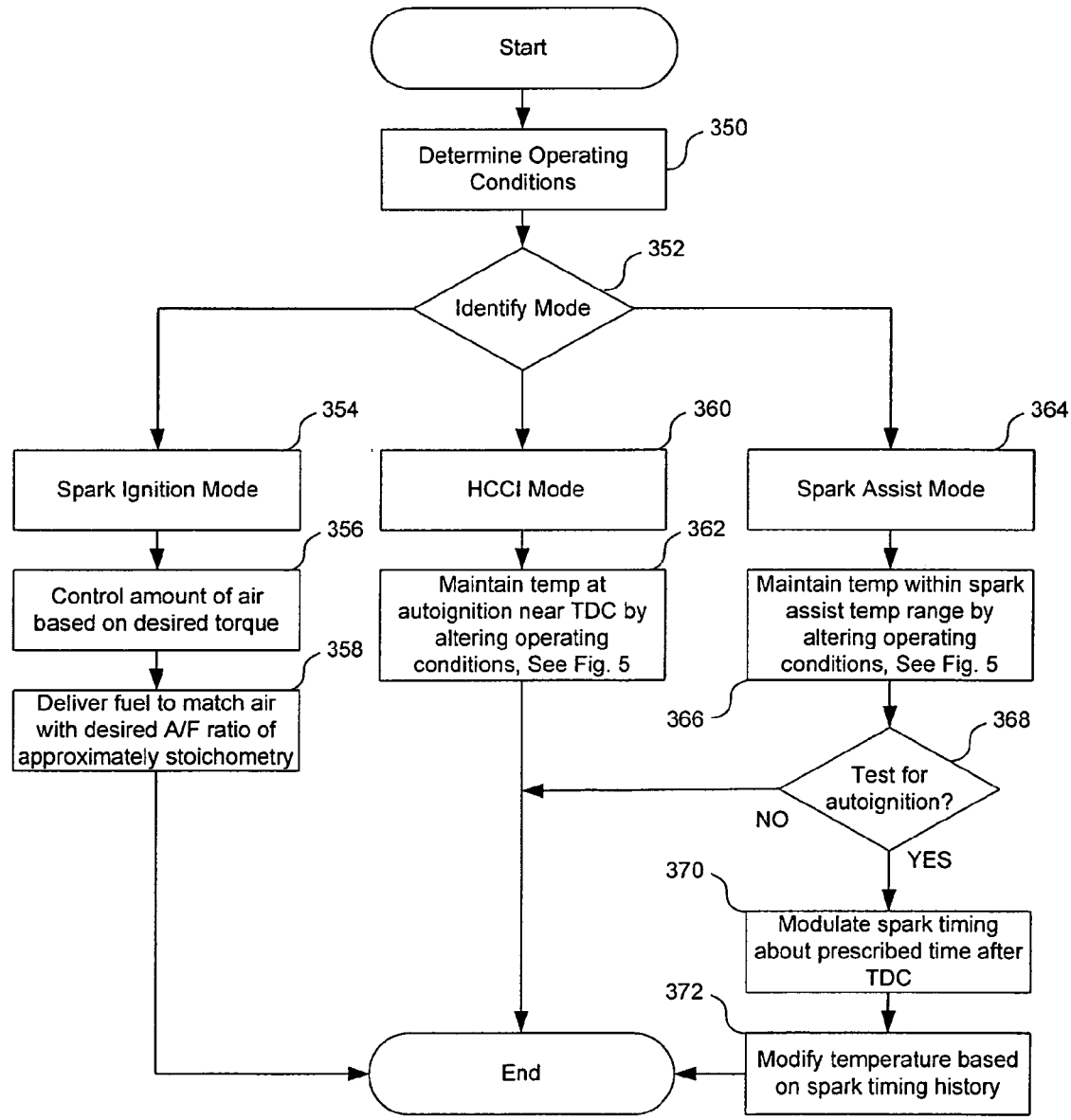

Referring now to FIGS. 3A and 3B, example routines are described for performing an engine control operation. The routines described by FIGS. 3A and 3B can provide for an improved fuel efficiency and reduction of NOx production through selectively enabling a combustion mode suitable for particular engine and/or vehicle conditions (such as engine load), thus advantageously utilizing both HCCI and spark assist modes.

Specifically, in FIG. 3A, a routine is described for selecting a desired engine combustion mode and modifying engine operating parameters during transitions between operating modes. First, at step 300, the operating parameters of the engine are determined, including, for example, desired engine output, desired load, desired air-fuel ratio, and others. Next, at 302, the appropriate operating mode is selected based on the operating conditions, as well as other engine and/or vehicle parameters, such as exhaust conditions, catalyst conditions, temperature, and others. In one example, the routine uses a map similar to that of FIG. 2 to select a desired combustion mode. Also, the mode selected may be based on transitional conditions. For example, if it is desired to change from SI mode to HCCI mode, the routine may select to transition through a spark assist mode to provide an improved transition from SI to HCCI combustion, or vice versa. Specifically, it may be difficult under some conditions to transition directly between SI to HCCI combustion, and thus as the spark assist combustion may be controlled with less precise temperature control of combustion gases, it may be used transitionally between modes.

Next, in step 304 it is judged whether a transition between modes is desired based on the desired mode and the current combustion mode. If no transition is to occur, the routine ends. Alternatively, it is judged in step 304 that a transition is requested, the routine proceeds to step 306.

At step 306, it is judged if a transition from SI to spark assist is requested. If the answer to step 306 is yes, the routine proceeds to step 308 where the temperature of the combustion chamber gas is adjusted. The adjustment of temperature may be performed by modifying the operating parameters of the engine such as through varying the valve timing, addition of exhaust gas recirculation (EGR), increasing the compression ratio, controlling aircharge temperature via a heat exchanger configuration, the contribution of supercharging or turbocharging or a combination thereof. Next, the routine proceeds to step 310 where the spark timing is adjusted, as described in more detail below with regard to FIG. 3B and FIG. 4, for example. Next, the routine ends. Alternatively, if the answer to step 306 is no, the routine proceeds to step 312.

At step 312 it is judged if a transition from spark assist to SI is requested. If the answer to step 312 is yes, then the routine proceeds to step 314, where the temperature control of the combustion chamber gas is discontinued. Next, the routine proceeds to step 316 where the spark timing is adjusted to the appropriate timing based on engine operating conditions and/or engine parameters. In other words, the routine returns to combustion where the engine carries out conventional spark ignition combustion. Next, the routine ends. Alternatively, if the answer to step 312 is no, the routine proceeds to step 318.

At step 318 it is judged if a transition from spark assist to HCCI is requested. If the answer to step 318 is yes, the routine proceeds to step 320 where the temperature of the combustion chamber gas is increased to the autoignition temperature by adjusting engine parameters, such as described herein. For example, valve timing may be adjusted via a cam profile switching mechanism to increase effective compression ratio and retain increased residual exhaust gasses, thereby raising charge temperature. However, various other approaches may also be used, such as application of heat exchangers to heat a stream of intake air and mix the heated and un-heated intake airstreams to control the intake air temperature, or combinations of various parameters. Next, the routine proceeds to step 322 where the spark timing is delayed or discontinued. For example, the spark timing may be delayed to a point past an expected autoignition timing. Next, the routine ends. Alternatively, the answer to step 318 is no, the routine proceeds to step 324.

At step 324 it is judged if a transition from HCCI to spark assist is requested. If the answer to step 324 is yes, the routine proceeds to step 326 where the temperature of the combustion chamber gas is decreased so that autoignition is reduced, and thus spark timing may be used to control the timing of combustion. Thus, the routine proceeds to step 328 where the spark timing is adjusted or initiated. Next, the routine ends. Alternatively, if the answer to step 324 is no, the routine proceeds to step 330.

At step 330 it is judged if a transition from HCCI to SI is requested. If the answer to step 330 is yes, the routine proceeds to step 332 where the temperature control of the combustion chamber gas is discontinued. The temperature control may be discontinued, or gradually reduced, depending on the transition conditions, in one example. For example, the spark assist may gradually be adjusted to conventional spark ignition timing over several cycles, if desired. Thus, the routine then proceeds to step 334 where the spark timing is adjusted or initiated based on engine operating conditions and/or engine parameters, including temperature, speed, load, and others. Next, the routine ends. Alternatively, the answer to step 330 is no, the routine proceeds to step 336.

At step 336, it is judged if a transition from SI to HCCI is requested. If the answer to step 336 is yes, the routine proceeds to step 338, where the temperature of the combustion chamber gas is increased to the autoignition temperature as described above herein. Next, the routine proceeds to step 340 where the spark timing is delayed or discontinued. Next, the routine ends. Alternatively, the answer to step 336 is no, the routine ends.

Referring to FIG. 3B, a routine is described for identifying the operating mode and modifying engine operating parameters based on a selected combustion mode. First, at step 350, the engine operating parameters are determined. For example, the routine determines engine speed, load, torque, temperatures (e.g., engine coolant temperature, air temperature, ambient temperature), and other parameters. Next, the routine proceeds to step 352 where the current operating mode is identified. If SI mode is selected, the routine proceeds to step 354. Next, the routine proceeds to step 356 where the air supplied to the engine is controlled based on the torque requirements of the engine. Next, the routine proceeds to step 358 where fuel is supplied to match the air supplied to the engine in order to create an air/fuel ratio approximately about stoichiometry. Next, the routine ends.

If on the other hand, HCCI mode is selected at step 352, the routine proceeds to step 360. Next, the routine proceeds to step 362 where the temperature of combustion chamber gas is maintained at autoignition temperature near TDC by altering operating parameters, such as those described above herein. For example, the routine may adjust valve timing, valve lift, the ratio of two intake airstreams that flow through or by-pass the heat exchangers, spark timing, EGR, turbo or super charger, and/or combinations thereof. Next, the routine ends.

If, on the other hand, spark assist mode is selected at step 352, the routine proceeds to step 364. Next, the routine proceeds to step 366 where the temperature of combustion chamber gas is maintained within the spark assist temperature range to retard autoignition, as described herein with regard to FIG. 4, for example. Next, the routine proceeds to step 368 where it is judged whether to test for autoignition. As described below, the routine may alter timing of the spark during this mode to determine if there is an expected effect caused by said variation. Such information can be used to vary the mixture temperature to enable improved spark assist combustion timing control.

If the answer to step 368 is no, the routine ends. If the answer to step 368 is yes, the routine proceeds to step 370 where the spark timing is modulated about a prescribed time shortly after TDC. Next, the routine proceeds to step 372 where the temperature of the gas within the combustion chamber is modified based on the spark timing history determined from step 370. For example, if it is determined that the firing of the spark is not controlling the timing of combustion (i.e., autoignition is occurring substantially without the spark), then temperature of the mixture may be reduced to return primary control of combustion timing to the firing of the spark plug. Further, this information can be used to improve transitions between various modes in that a more accurate identification of the limits of autoignition can be identified during engine operation and take into account varying conditions and aging effects. Finally, the routine ends.

Figure 4A:
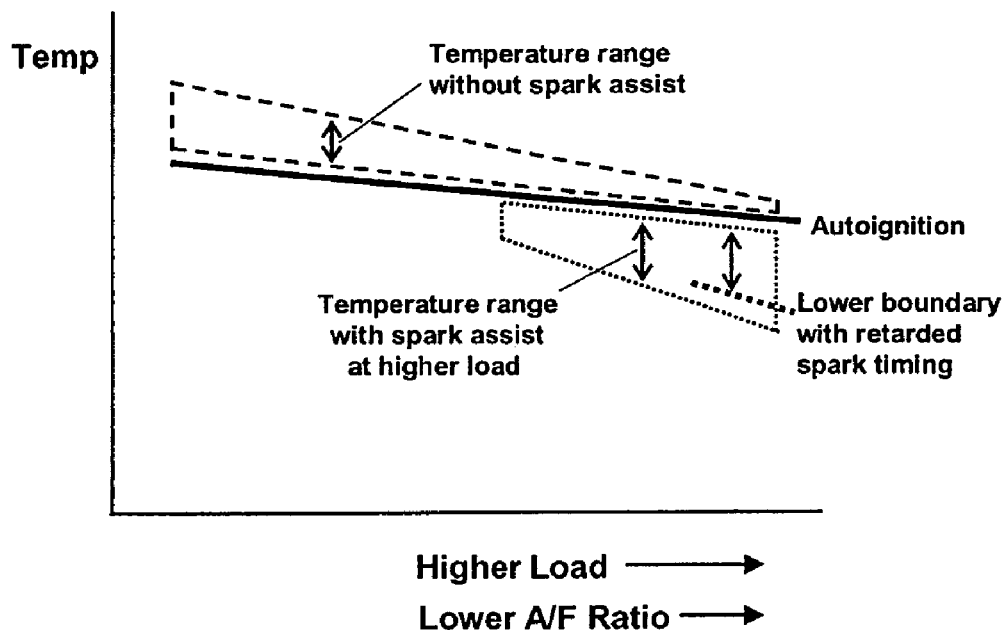
FIGS. 4A and 4B are graphs showing example temperature windows with and without spark assist as a function of engine load and air/fuel ratio.

Referring now to FIG. 4A, it shows a graph of autoignition temperature at various engine loads as the solid line. During periods of high engine load in HCCI mode without spark assist, the acceptable temperature control window decreases with decreased air/fuel ratios, as schematically shown in FIG. 4A. A smaller temperature window results in increased difficulty in autoignition timing control. Additionally, FIG. 4A shows a desired or acceptable temperature range of the air and fuel mixture in the combustion chamber during a spark assist mode at higher loads. The wider temperature window due to spark assistance improves controllability of combustion timing; hence the HCCI operating range can be utilized at higher load. Also, while FIG. 4A shows variation with load, the temperatures or temperature ranges may also vary with combustion air-fuel ratio or the gas/fuel ratio.

Furthermore, combustion timing of spark-assist autoignition at higher load can be further retarded to reduce engine heat transfer losses and constrain the peak cylinder pressure, which affects the required rigidity of engine structure. Without spark assistance, retarding HCCI combustion timing is constrained by misfire. This is because the released heat and radicals generated during the low-temperature reactions at or before TDC may not be sufficient to proceed to high-temperature reactions in the mixture if the gas temperature drops too quickly due to expansion. With a spark occurring after TDC, the combustion timing can be further retarded and thus increase the HCCI operating range to higher loads. It should be pointed out that significantly further retard of spark timing from TDC changes the lower boundary of the temperature range, as shown in FIG. 4A. When the engine load increases and the spark timing is to be further retarded, the engine controller controls the devices, such as the ratio of two intake airstreams that flow through or by-pass the heat exchangers, EGR rate, valve timing, valve lift, or others to increase the gas temperature slowly but continuously to make sure that autoignition can occur with spark assistance. The increase in gas temperature may be stopped when it is detected that the spark plays no role in autoignition, as described later. At that time, the gas temperature may be adjusted to be a slightly lower for using a spark to control combustion timing.

Alternatively, with FIG. 4B, a target temperature range for utilizing the spark-assist mode is shown below the autoignition temperature, where the target temperature range is gradually further from the auto-ignition temperature with increasing load (and/or with decreasing air-fuel ratio). Further, in an alternative embodiment, the lower limit of the temperature range can be a function of air/fuel ratio and the upper limit a function of autoignition temperature and load. The temperature difference, denoted as DT, represents a difference between the autoignition temperature and the upper temperature of the spark assist temperature range. As described herein, this difference can be used to adjust the engine parameters (such as temperature) to provide a greater difference between the mixture temperature and the autoignition temperature as load and or air-fuel ratio changes, thus enabling extension of the spark assist mode. This difference may also be used to facilitate HCCI-SI mode transition, because the mixture temperature is lower and more close to the temperature required for SI combustion.

In other words, as load increases the temperature required for autoignition can decrease, at least in some load ranges, due to the increased pressure and therefore increased oxygen density within the combustion chamber. Also, under high load conditions, the temperature range or temperature window decreases with decreased air/fuel ratios. On the other hand, as load increases, the control of temperature within the combustion chamber can degrade. Thus, in one embodiment, a desired temperature difference (DT) can be increased with increased load or varying air/fuel ratio in order to account for the greater error associated with temperature control so that autoignition temperature is not achieved, but rather combustion is timed by the firing of the spark plug.

Figure 4B:
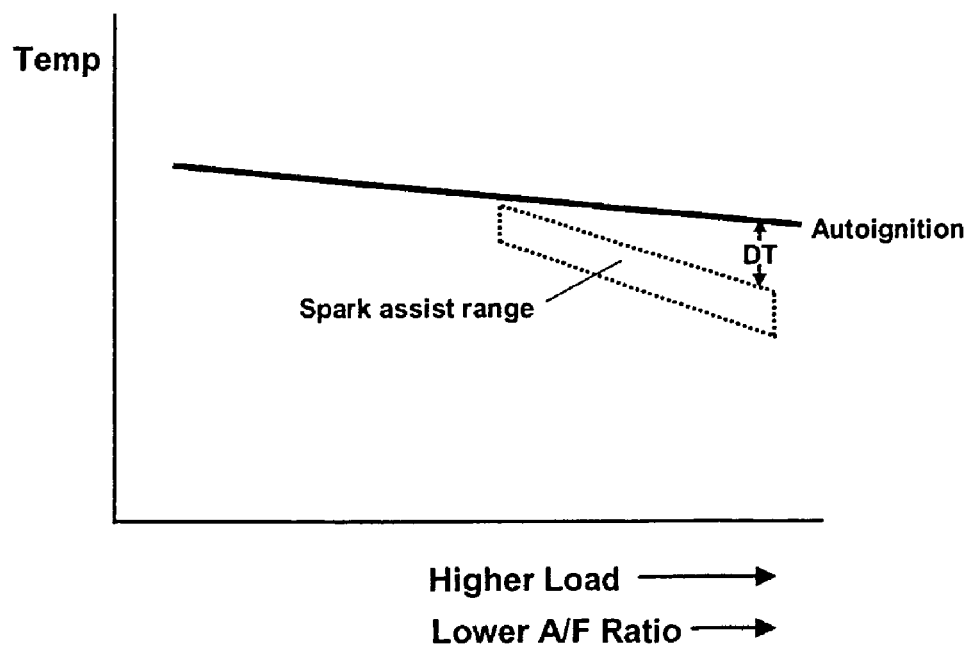
Figure 5:
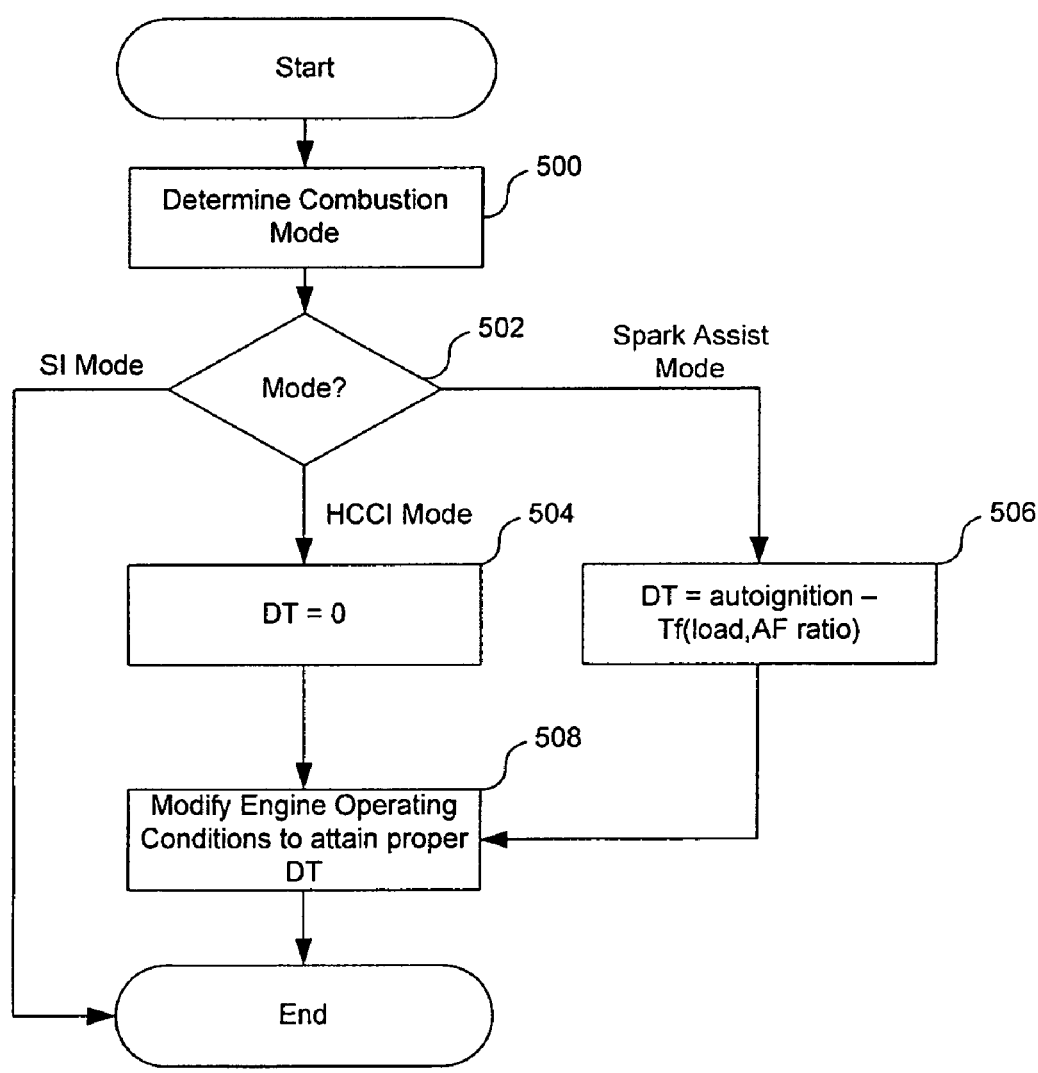
FIG. 5 is a view of an example method for determining the target air and fuel mixture operating temperature.

Referring to FIG. 5, an example routine is described for determining the target engine operating temperature depending on combustion mode utilizing the information in FIGS. 4A and 4B. The routine begins at step 500 where the combustion mode is determined. Next, the routine proceeds to step 502 where the combustion mode is identified, as determined in FIG. 3. If the engine is operating in SI mode the routine ends since temperature control under SI operations may be discontinued or reduced.

Alternatively, if it is judged at step 502 that the engine is operating in HCCI mode, the routine proceeds to step 504, where the temperature difference between the target temperature and autoignition (DT) is set to zero. In other words, the temperature control during an HCCI mode is selected to achieve the autoignition temperature without spark assist.

If, instead it is judged at step 502 that the engine is operating in spark assist mode, the routine proceeds to step 506 where DT is determined as the difference between the autoignition temperature and the upper limit of the spark assist temperature range as a function of load, speed, and/or air/fuel ratio. Next, the routine proceeds to step 508 where the engine operating parameters may be modified in order to attain the target temperature from the calculated DT.

As noted above, adjustment of the target temperature range may occur not only in the spark assist mode, but also when the engine is transitioning between operating modes. For example, during transition periods between modes, the target operating temperature may be a function based on the beginning and ending target temperatures of the modes involved in the transition.

Figure 6A:
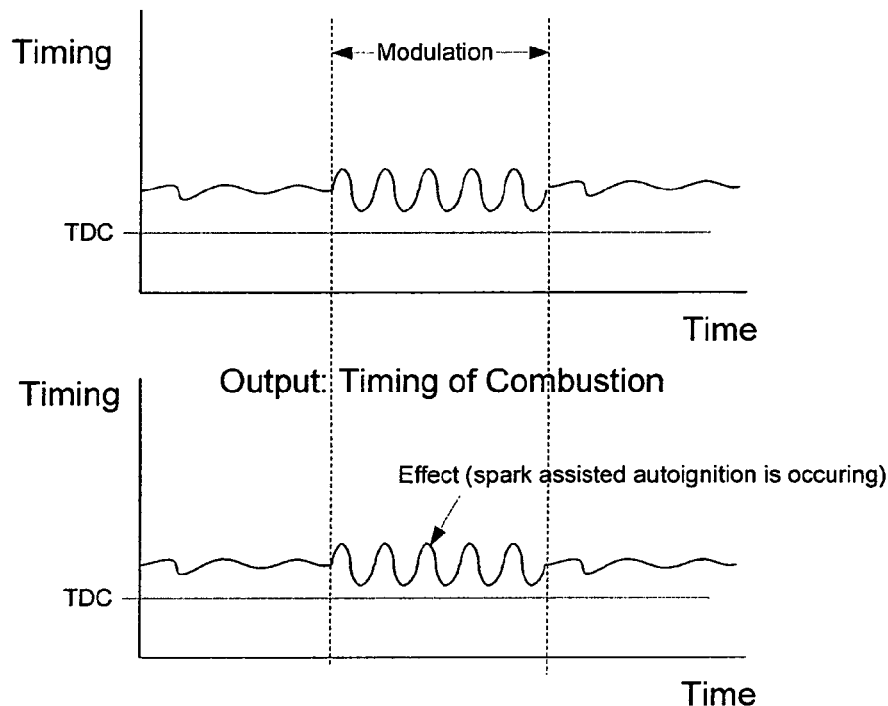
FIGS. 6A and 6B are views of an example temperature measurement system through the intentional varying of the spark timing to determine whether auto-ignition is occurring.
Figure 6B:
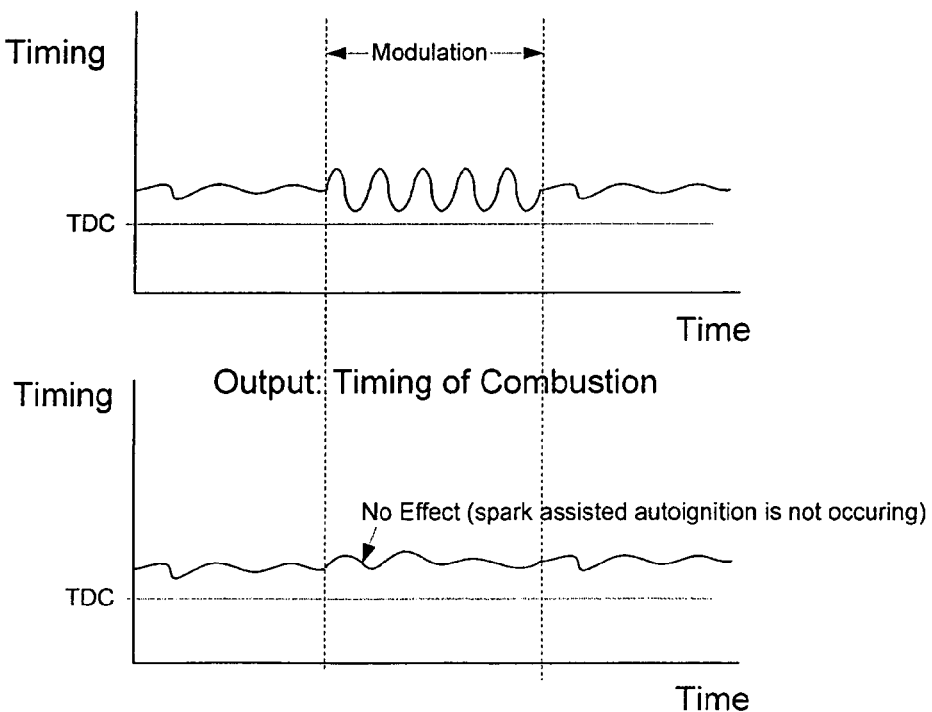

Referring now to FIGS. 6A and 6B, example results are illustrated for the testing procedure described above herein. Specifically, FIGS. 6A and 6B are graphs showing an example input spark assist operation where the spark timing may be varied or modulated in order to detect whether autoignition is occurring at a desired timing and to further serve as an indirect method for detecting temperature of the combustion chamber gasses. In one example implementation of the process, the spark timing may be modulated around a prescribed time after top dead center of the compression stroke and may be applied at times during the spark assist mode or during transitions between modes. The modulation of the spark timing may produce a resulting combustion timing, for example the timing of 50% heat released or the timing of peak heat release rate, that varies depending on whether autoignition is occurring or is not occurring at a desired timing.

For example, if the input is the modulation of the spark timing around a prescribed time after TDC under conditions where autoignition is not attained without a spark, then the output as shown in FIG. 6A may be a proportionate combustion timing indicating that the timing of combustion (and the fact that combustion occurs) is substantially due to the spark assist. As shown in FIG. 6A, the resulting output timing is of high correlation with the input modulation.

On the other hand, an example output as shown in FIG. 6B may be absent of significant effect of the modulated spark and therefore indicates that autoignition is occurring prior to the spark assist timing. As shown in FIG. 6B, the resulting output timing is of lower correlation to the output shown in FIG. 6A. In other words, the spark assist is substantially ineffective in controlling combustion timing. As described above and below in more detail, this information may be used to adjust engine operating conditions, such as mixture temperature, air-fuel ratio, valve timing, etc., to reduce the likelihood of autoignition, and return combustion timing control primarily to the spark timing.

Further, the extent to which autoignition is occurring premature of a prescribed time or engine position may be determined from the difference between the timing of the spark generated by the sparking device and the timing of combustion. For example, if the spark generated from the sparking device is concurrent with combustion, then autoignition may not be occurring and therefore the temperature of the combustion chamber gas is lower than required for autoignition. On the other hand, if the spark generated from the sparking device occurs after combustion, it may be inferred that the combustion occurred due to autoignition; hence the temperature of the combustion chamber gas has attained the autoignition temperature.

Alternatively, whether or not the spark is effective in assisting autoignition may also be ascertained by detecting the timing of peak cylinder pressure during modulation of spark timing. If the spark plays a role in assisting autoignition, the timing of peak cylinder pressure will also vary according to the variation of spark timing.

In a one example implementation of the spark modulation process, the operating parameters of the engine may be modified, based on timing history results, to achieve a prescribed temperature within the combustion chamber. For example, if the modulation of the spark timing determines that autoignition is occurring while operating in spark assist mode, it may be possible to retard autoignition through the reduction of operating temperature by reducing EGR or heat exchanger contribution, adjusting valve timing, reducing the compression ratio or modifying another operating condition of the engine, etc. Thus, the spark assist modulation may be varied concurrently with the engine operating parameters in an iterative manner to promote proper autoignition timing, increase correlation between modulation timing and combustion timing, and provide an indirect method of temperature detection.

Note that the control and estimation routines included herein can be used with various engine configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12.

Figure 7:
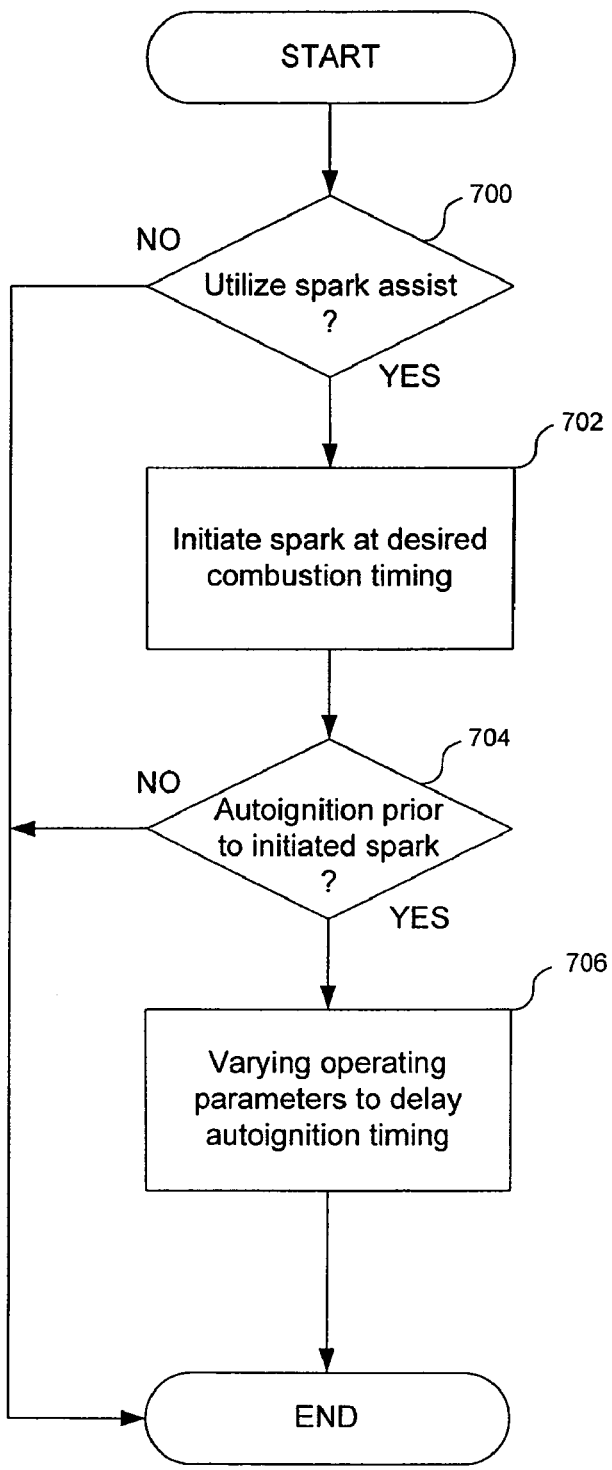
FIG. 7 shows a flowchart depicting an example method for controlling engine operation.

Referring now to FIG. 7, a flow chart for controlling spark-assisted combustion operation is shown. Beginning at step 700, it is judged whether a spark assist mode is being utilized. If the answer to step 700 is no, the routine ends. Alternatively, if the answer to step 700 is yes, the routine proceeds to step 702. At step 702 an assist spark is initiated in order to obtain combustion at a desired timing, as described herein. Further, as noted previously, the timing of the spark during spark-assisted operation may be varied with charge temperature, engine speed, engine load, and others.

Next, the routine proceeds to step 704, where it is judged whether autoignition is occurring prior to the initiated spark. The occurrence of autoignition may be detected using a variety of methods as provided above with reference to FIGS. 6A and 6B, for example. Continuing with step 704, if the answer is judged no, the routine ends. Alternatively, if the answer to step 704 is yes, the routine proceeds to step 706. In the event that autoignition occurs before the initiated assist spark, degraded engine operation may occur in the form of engine knock, decreased fuel efficiency and/or increased emissions among various others.

Next, the routine proceeds to step 706 where an engine operating parameter or plurality of parameters are varied in order to delay autoignition timing and/or increase correlation between the variation in spark timing and variation in combustion timing. In some embodiments, engine operating parameters such as intake air temperature, valve timing, fuel injection timing, compression ratio, turbocharging, supercharging or air/fuel ratio among other parameters may be varied. For example, in the event of premature autoignition, EGR contribution may be reduced in order to lower intake air temperature. Thus, a lower intake air temperature may delay autoignition to within a timing range where an assist spark may be initiated at a desired time. In this manner, undesired premature autoignition may be mitigated and an assist spark utilized to initiate combustion at the desired combustion timing. Alternatively, valve timing may be varied to reduce residual gasses in the combustion chamber to thereby lower temperature. In still another example, air-fuel ratio may be varied. In still another example, intake air heating can be reduced.

In this way, it is possible to retain control of combustion timing during spark-assisted auto-ignition combustion even when various factors inadvertently affect engine operation. In other words, engine aging and various other parameters may affect engine operation such that auto-ignition occurs prematurely (e.g., before spark timing), which can decrease engine torque production, for example. However, by detecting such a condition and taking corrective action to return control of combustion timing to the timing of the spark, improved operation can be achieved.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of operating an internal combustion engine having a combustion chamber with a piston, comprising:
   adjusting an operating parameter of the engine so that a mixture of air and fuel in the combustion chamber approaches, but does not achieve, an autoignition temperature, and performing a spark from a spark plug so that said mixture combusts;
   adjusting a timing of said spark from the spark plug; and
   determining whether timing of said combustion correlates to timing of said spark.

2. The method of claim 1 wherein said mixture includes a region having a richer air-fuel ratio, where said region is near a spark plug in said piston.

3. The method of claim 2, where said combustion occurs after top dead center of the piston position.

4. The method of claim 3, where the spark timing is varied as engine load varies.

5. The method of claim 2 wherein said operating parameter is a valve timing.

6. The method of claim 2 wherein said operating parameter is a charge temperature.

7. A method of operating an internal combustion engine having a combustion chamber with a piston, comprising:
   adjusting a temperature of an air and fuel mixture of the engine so that said mixture of air and fuel in the combustion chamber approaches, but does not achieve, said autoignition temperature; and performing a spark from a spark plug after top dead center of piston position so that said mixture combusts, wherein a timing of performing said spark varies with increasing engine load;
   further adjusting a timing of said spark from the spark plug;
   determining whether timing of said combustion correlates to timing of said spark; and
   adjusting an operating parameter to reduce an amount by which said mixture approaches said autoignition temperature based on said determination.

8. The method of claim 7 wherein said temperature of said air and fuel mixture is adjusted to be further from said autoignition temperature as engine load increases.

9. The method of claim 7 wherein said temperature of said air and fuel mixture is adjusted to be further from said autoignition temperature before a combustion mode transition to another combustion mode.

10. The method of claim 8 wherein said spark timing is further retarded from top dead center of piston position with increasing engine load.

11. The method of claim 10 wherein the temperature of the air and fuel mixture is increased until an effect of said spark timing on ignition timing is decreased below a threshold, and then decreasing said temperature below the autoignition temperature.

12. A method of operating an internal combustion engine having a combustion chamber with a piston, comprising:
   adjusting an operating parameter of the engine so that a mixture of air and fuel in the combustion chamber approaches, but does not achieve, an autoignition temperature, and performing a spark from a spark plug so that said mixture combusts;
   adjusting a timing of said spark from the spark plug; and
   adjusting the operating parameter to increase a correlation between said adjusted spark timing and timing of said combustion.

13. The method of claim 12 wherein said mixture includes a region having a richer air-fuel ratio, where said region is near a spark plug in said piston.

14. The method of claim 12 wherein said operating parameter is a valve timing.

15. The method of claim 12 wherein said operating parameter is an air temperature.

16. The method of claim 1, further comprising advancing the spark timing when the timing of said combustion does not correlate to said timing of said spark.

17. The method of claim 1, further comprising retarding the spark timing when the timing of said combustion correlates to said timing of said spark and the timing of said combustion is before a threshold time.

18. The method of claim 7, wherein said temperature of said air and fuel mixture is reduced in response to a transition to another combustion mode.

19. The method of claim 7, further comprising reducing the temperature of a subsequent mixture of air and fuel when said timing of said combustion does not correlate to said timing of said spark.

20. The method of claim 12, wherein said operating parameter includes at least one of a level of turbocharging, an amount of exhaust gas recirculation, and a temperature of air delivered to the combustion chamber.

* * * * *